(12) United States Patent
Velyaev et al.

(10) Patent No.: US 12,392,271 B2
(45) Date of Patent: Aug. 19, 2025

(54) MODULARLY CONSTRUCTED EXHAUST GAS TREATMENT ARRANGEMENT

(71) Applicant: Purem GmbH, Neunkirchen (DE)

(72) Inventors: Oleksandr Velyaev, Stuttgart (DE); Shengxiao Lin, Esslingen (DE); Peter Kast, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/640,983

(22) Filed: Apr. 19, 2024

(65) Prior Publication Data
US 2024/0352883 A1 Oct. 24, 2024

(30) Foreign Application Priority Data

Apr. 21, 2023 (DE) ..................... 10 2023 110 142.0

(51) Int. Cl.
| | |
|---|---|
| F01N 13/00 | (2010.01) |
| F01N 3/021 | (2006.01) |
| F01N 3/10 | (2006.01) |
| F01N 3/20 | (2006.01) |
| F01N 3/28 | (2006.01) |

(52) U.S. Cl.
CPC ......... *F01N 13/0097* (2014.06); *F01N 3/021* (2013.01); *F01N 3/106* (2013.01); *F01N 3/2066* (2013.01); *F01N 3/2882* (2013.01); *F01N 3/2892* (2013.01); *F01N 2610/1453* (2013.01)

(58) Field of Classification Search
CPC ...... F01N 13/0097; F01N 3/021; F01N 3/106; F01N 3/2066; F01N 3/2882; F01N 3/2892; F01N 2610/1453
See application file for complete search history.

(56) References Cited

U.S. PATENT DOCUMENTS

| | | | |
|---|---|---|---|
| 8,695,330 B2 * | 4/2014 | Davidson | B01D 53/9495 60/303 |
| 10,907,522 B2 * | 2/2021 | Poinsot | F01N 3/208 |
| 10,914,218 B1 * | 2/2021 | Chapman | F01N 3/2066 |
| 2009/0158721 A1 | 6/2009 | Wieland et al. | |
| 2010/0242450 A1 * | 9/2010 | Werni | F01N 13/0097 60/299 |

(Continued)

FOREIGN PATENT DOCUMENTS

| | | | | |
|---|---|---|---|---|
| DE | 10 2015 015 505 A1 | | 6/2016 | |
| DE | 102020007553 A1 * | | 3/2021 | ........... F01N 13/009 |
| DE | 10 2021 111 759 A1 | | 11/2022 | |

*Primary Examiner* — Matthew T Largi
(74) *Attorney, Agent, or Firm* — Walter Ottesen, P.A.

(57) ABSTRACT

In a modularly configured exhaust gas treatment arrangement, a first module includes an entry interface and a first mixing section, a second module includes a first deflection housing and a first catalytic converter arrangement of a first exhaust gas treatment section. The second module is detachably connected to the first module and a third module includes a particle filter arrangement of the first exhaust gas treatment section. The third module is detachably connected to the second module and a fourth module includes a second deflection housing. The fourth module is detachably connected to the third module. A fifth module includes a second mixing section, a third deflection housing, and a second exhaust gas treatment section and the fifth module is detachably connected to the fourth module.

16 Claims, 3 Drawing Sheets

(56) References Cited

U.S. PATENT DOCUMENTS

| | | | |
|---|---|---|---|
| 2015/0071822 A1* | 3/2015 | Stanavich | B01F 25/3131 |
| | | | 422/128 |
| 2016/0115847 A1* | 4/2016 | Chapman | F01N 3/2892 |
| | | | 60/324 |
| 2016/0160727 A1 | 6/2016 | Isada et al. | |
| 2017/0241322 A1 | 8/2017 | Isada et al. | |
| 2019/0323397 A1* | 10/2019 | Pill | F01N 3/2892 |
| 2020/0032695 A1* | 1/2020 | Bean | F16B 2/08 |
| 2022/0251994 A1* | 8/2022 | Lin | F01N 3/2892 |
| 2022/0341355 A1* | 10/2022 | Webb | F01N 3/208 |
| 2022/0356832 A1* | 11/2022 | Brenner | B01D 53/9431 |

* cited by examiner

MODULARLY CONSTRUCTED EXHAUST GAS TREATMENT ARRANGEMENT

CROSS-REFERENCE TO RELATED APPLICATIONS

This application claims priority of German patent application no. 10 2023 110 142.0, filed Apr. 21, 2023, the entire content of which is incorporated herein by reference.

TECHNICAL FIELD

The present disclosure relates to modularly constructed exhaust gas treatment arrangements, which, in particular in exhaust gas systems of internal combustion engines used in vehicles, contribute to reducing the pollutant emissions.

BACKGROUND

Such exhaust gas treatment arrangements, which are used, for example, in association with diesel internal combustion engines, generally include, following one another in the direction of flow, a diesel oxidation catalytic converter, a diesel particle filter, and an SCR catalytic converter. A mixing section is provided upstream of the SCR catalytic converter, in which exhaust gas and reaction agent dispensed by a reaction agent dispensing arrangement, generally designated as an injector, for example a urea-water solution, are mixed and reacted to subsequently carry out a selective catalytic reduction in the SCR catalytic converter. To comply with the exhaust gas norms, which are becoming stricter, it can be necessary to connect a further SCR catalytic converter upstream of these system areas provided for exhaust gas treatment. A further mixing section is required in association with this further SCR catalytic converter, generally designated as a pre-SCR catalytic converter, in order to mix exhaust gas with reaction agent upstream of this pre-SCR catalytic converter and supply it to the pre-SCR catalytic converter.

Since the installation space available for receiving exhaust gas treatment arrangements is limited in vehicles, for example, also utility vehicles or trucks, and it is also thus predetermined where in such vehicles the upstream or downstream connection areas are provided for the integration of an exhaust gas treatment arrangement in an exhaust gas system, the requirement also exists in principle of housing exhaust gas treatment arrangements containing further system areas while maintaining or achieving an optimum flow behavior with the least possible counter pressure in the installation space which is available in already existing or conceived vehicles. This requires that when further system areas are integrated in such exhaust gas treatment arrangements, their external dimensions also cannot or cannot significantly deviate from the external dimensions of already existing exhaust gas treatment arrangements. At the same time, the possibility has to exist or be retained of having access to system areas of such exhaust gas treatment arrangements which degrade in exhaust gas treatment operation and therefore require maintenance or replacement.

SUMMARY

It is an object of the present disclosure to provide an exhaust gas treatment arrangement, in particular for an exhaust gas system of an internal combustion engine in a vehicle, which, with improved exhaust gas treatment capacity, offers the possibility of maintenance or replacement of system areas thereof.

This object is achieved according to the disclosure by a modularly constructed exhaust gas treatment arrangement, including:
- an entry interface for receiving exhaust gas in the exhaust gas treatment arrangement,
- a first mixing section,
- a first exhaust gas treatment section having a first catalytic converter arrangement and a particle filter arrangement,
- a second mixing section,
- a second exhaust gas treatment section having a second catalytic converter arrangement,
- a first deflection housing, which connects an exit area of the first mixing section to an entry area of the first exhaust gas treatment section,
- a second deflection housing, which connects an exit area of the first exhaust gas treatment section to an entry area of the second mixing section,
- a third deflection housing, which connects an exit area of the second mixing section to an entry area of the second exhaust gas treatment section.

In this exhaust gas treatment arrangement, it is furthermore provided according to the disclosure that:
- a first module includes the entry interface and the first mixing section,
- a second module includes the first deflection housing and the first catalytic converter arrangement of the first exhaust gas treatment section, wherein the second module is detachably connected to the first module,
- a third module includes the particle filter arrangement of the first exhaust gas treatment section, wherein the third module is detachably connected to the second module,
- a fourth module includes the second deflection housing, wherein the fourth module is detachably connected to the third module,
- a fifth module includes the second mixing section, the third deflection housing, and the second exhaust gas treatment section, wherein the fifth module is detachably connected to the fourth module.

Due to the breakdown of the exhaust gas treatment arrangement into a plurality of modules detachably connected to one another, there is the possibility of constructing each such module alone and detached from other modules and integrating it as such in the exhaust gas treatment arrangement or removing it therefrom to carry out maintenance or replacement work. At the same time, the use of a plurality of modules in the exhaust gas treatment arrangement assists spatial positioning of the individual modules or system areas of the individual modules in relation to one another such that a compact construction is obtained, which permits an exhaust gas treatment arrangement, in particular also containing a further mixing section, to be integrated into the installation space available in already constructed or conceived vehicles.

For a connection of the modules to one another which is simple to implement and also reliable and gas-tight, it is proposed that at least one module of the first module, second module, third module, fourth module, and fifth module be detachably connected to at least one further module of the first module, second module, third module, fourth module, and fifth module by a screw connection and/or a clamp connection.

It is to be noted in this context that when two modules adjoin one another and are to be detachably connected to one another in the area of tubular elements, the tubular elements can be positioned adjoining one another with flange-type ends thereof, possibly with a seal element interposed, and can be connected to one another by a pipe clamp externally enclosing the flange-type ends or by threaded bolts or the like which are led through the flange-type ends or couple them to one another. For the detachable attachment of a tubular element of one module to a deflection housing of another module, a flange-type end of the tubular element can be attached to the deflection housing by a threaded bolt or the like extending through this end and a wall of the deflection housing or provided thereon. Alternatively, to attach a tubular element of a module, constructed having a flange-type end, to a deflection housing, the deflection housing can have a tubular or nozzle-type area having a flange-type end protruding from a wall thereof, which is positioned opposite to the flange-type end of the tubularly constructed element, possibly with a seal element interposed, and is connected via a pipe clamp externally enclosing these flange-type ends or a plurality of threaded bolts or the like extending through the flange-type ends or coupling them to one another.

For the detachable connection of the first module to the second module, the exit area of the first mixing section can be detachably connected to an entry area of the first deflection housing.

The second module can be detachably coupled with the third module in a simple manner in that an exit area of the first catalytic converter arrangement is detachably connected to an entry area of the particle filter arrangement.

The third module can be detachably connected to the fourth module in that an exit area of the particle filter arrangement is detachably connected to an entry area of the second deflection housing.

For the detachable connection of the fourth module to the fifth module, it is proposed that an exit area of the second deflection housing be detachably connected to the entry area of the second mixing section.

To efficiently reduce the nitrogen oxide proportion in the exhaust gas emitted by an internal combustion engine, in particular a diesel internal combustion engine, it is proposed that the first catalytic converter arrangement include a pre-SCR catalytic converter unit, and that the first module have a first reaction agent interface for receiving a first reaction agent dispensing arrangement.

For example, the first reaction agent interface can be provided in the area of an entry area of the first mixing section.

The first catalytic converter arrangement can furthermore include an oxidation catalytic converter unit.

To reduce the nitrogen oxide proportion in the exhaust gas emitted by an internal combustion engine as much as possible, the second catalytic converter arrangement can include at least one main SCR catalytic converter unit, and the fourth module can have a second reaction agent interface for receiving a second reaction agent dispensing arrangement.

In order to make the capacity of the second catalytic converter arrangement for reducing the nitrogen oxide proportion as large as possible, it can include two main SCR catalytic converter units connected in parallel to one another.

To achieve a compact configuration, it is proposed that, in the circumferential direction around a longitudinal center access of the exhaust gas treatment arrangement, one of the main SCR catalytic converter units follows the first exhaust gas treatment section, the second mixing section follows the one main SCR catalytic converter unit of the two main SCR catalytic converter units, the other main SCR catalytic converter unit of the two main SCR catalytic converter units follows the second mixing section, and the first exhaust gas treatment section follows the other main SCR catalytic converter unit of the two main SCR catalytic converter units.

A compact construction of the exhaust gas treatment arrangement according to the disclosure can furthermore be assisted in that the first mixing section is elongated in the direction of a first mixing section longitudinal axis, which is essentially parallel to an exhaust gas treatment arrangement longitudinal axis, the second mixing section is elongated in the direction of a second mixing section longitudinal axis, which is essentially parallel to the exhaust gas treatment arrangement longitudinal axis, the first exhaust gas treatment section is elongated in the direction of a first exhaust gas treatment section longitudinal axis, which is essentially parallel to the exhaust gas treatment arrangement longitudinal axis, the second exhaust gas treatment section is elongated in the direction of a second exhaust gas treatment section longitudinal axis, which is essentially parallel to the exhaust gas treatment arrangement longitudinal axis, and the first mixing section, the second mixing section, the first exhaust gas treatment section, and the second exhaust gas treatment section are arranged overlapping one another in the direction of the exhaust gas treatment arrangement longitudinal axis.

If the first deflection housing and the third deflection housing are arranged here in a first axial end area of the exhaust gas treatment arrangement with respect to an exhaust gas treatment arrangement longitudinal axis and the second deflection housing is arranged in a second axial end area with respect to the exhaust gas treatment arrangement longitudinal axis, essentially all system areas extending in the direction of the exhaust gas treatment arrangement longitudinal axis are located in the same axial area or essentially completely overlapping one another, so that a construction which is compact in the direction of the exhaust gas treatment arrangement longitudinal axis is achieved.

An exit housing can be provided for the emission of treated exhaust gas from the exhaust gas treatment arrangement, wherein an exit area of the second exhaust gas treatment section is open to the exit housing, and an exit interface for emitting exhaust gas from the exhaust gas treatment arrangement can be provided on the exit housing. For example, the exit housing can form a component of the fifth module.

To assist the mixing of exhaust gas and reaction agent in the second mixing section, at least a part of the second mixing section can extend in the interior of the exit housing.

The disclosure furthermore relates to an exhaust gas system for an internal combustion engine, including an exhaust gas treatment arrangement constructed according to the disclosure.

BRIEF DESCRIPTION OF DRAWINGS

The invention will now be described with reference to the drawings wherein.

DETAILED DESCRIPTION

Figure 1:
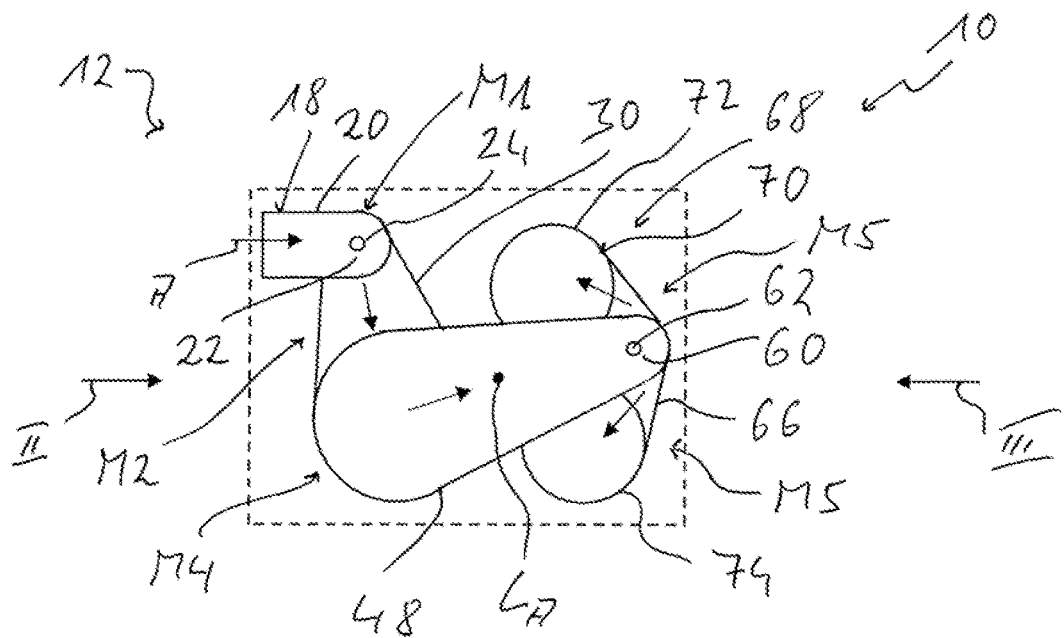
FIG. 1 shows a schematic top view of an exhaust gas treatment arrangement in viewing direction I in FIG. 2.

In the figures, a schematically shown exhaust gas treatment arrangement for an exhaust gas system 10 of an internal combustion engine is generally designated by 12. The exhaust gas treatment arrangement 12 is modularly constructed in principle and includes five modules M1 to M5, described hereinafter in detail, which are detachably connected to one another.

A first module M1 includes a first mixing section 14, constructed, for example, using a tubular element 26. At an entry area 16 of the first mixing section 14, an entry interface 18 of the exhaust gas treatment arrangement 12, which is constructed, for example, using a pipe section or a pipe connecting piece, is provided, using which it can be connected to an upstream area of the exhaust gas system 10. Exhaust gas A emitted by an internal combustion engine enters the exhaust gas system 10 in the area of the entry interface 18.

A first reaction agent interface 22 is provided in the area of the entry area 16 of the first mixing section 14 or at the tubular element 20, which also provides the entry interface 18. A first reaction agent dispensing arrangement 24, also designated in general as an injector, can be connected in the area of the first reaction agent interface 22 to the module M1 in an upstream area of the first mixing section 14. A reaction agent, such as a urea/water solution, can be introduced by the first reaction agent dispensing arrangement 24 into the exhaust gas A flowing into the exhaust gas system 10 in the area of the entry interface 18. For efficient mixing of reaction agent, generally dispensed as a spray mist, with the exhaust gas A, for example, a mixer constructed using a large number of blade-like deflection elements or the like can be arranged in the first mixing section 14. As it flows along the tubular element 26, which is essentially elongated in a first mixing section longitudinal direction LM1, of the first mixing section 14 the exhaust gas A mixes with the reaction agent.

Figure 4:
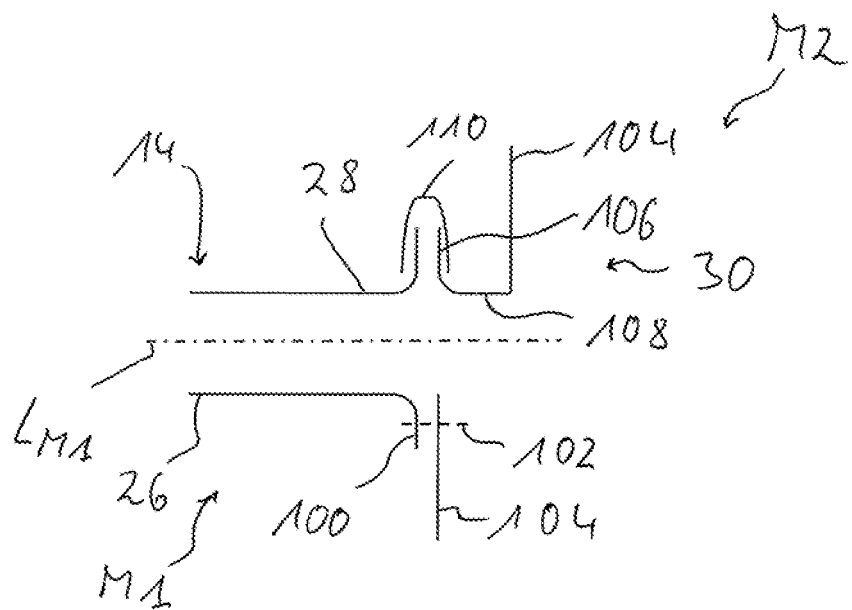
FIG. 4 shows a schematic representation of the detachable connection of two modules of the exhaust gas treatment arrangement of FIG. 1; and, FIG. 5 shows a schematic representation of the area of the exhaust gas treatment arrangement of FIG. 1, in which the exhaust gas treated in the exhaust gas treatment arrangement leaves the exhaust gas treatment arrangement at an exit interface.

A downstream exit area 28 of the first mixing section 14 is detachably connected, as illustrated by an area indicated by dashed lines, to a first deflection housing 30. For this purpose, a flange-like end 100 of the tubular element 26 of the first mixing section 14, which can be seen in the lower part of FIG. 4, can be detachably connected by a plurality of threaded bolts 102 or the like to a wall 104 of the first deflection housing 30. Alternatively, as illustrated in the upper part of FIG. 4, a pipe connecting piece 108 formed having a flange-like end 106 can be provided on the wall 100 of the first deflection housing 30, wherein the flange-like ends 100, 106 on the tubular element 26, on the one hand, and on the first deflection housing 30, on the other hand, which then abut one another, can be connected to one another firmly and in a gas-tight manner by a plurality of threaded bolts or by a pipe clamp 110 enclosing them.

The exhaust gas or mixture of exhaust gas and reaction agent introduced in the exit area 28 of the first mixing section 14 into the first deflection housing 30 in an entry area 31 thereof is deflected in the first deflection housing 30 with respect to an exhaust gas treatment arrangement longitudinal direction $L_A$ by approximately 180° and leaves the first deflection housing 30 in the direction of a first exhaust gas treatment section 32. The first exhaust gas treatment section 32 includes, following one another in the direction of flow, a first catalytic converter arrangement 34 and a particle filter arrangement 36. The first catalytic converter arrangement 34 includes a pre-SCR catalytic converter unit 38 and, for example, downstream thereof, an oxidation catalytic converter unit 40.

The first deflection housing 30 forms, with the first catalytic converter arrangement 34 of the first exhaust gas treatment section 32, which is fundamentally elongated in a first exhaust gas treatment arrangement longitudinal direction $L_{A1}$ and can also have flow through it in this direction, a second module M2. For this purpose, for example, a tubular jacket of the first catalytic converter arrangement 34, which receives the pre-SCR catalytic converter unit 38 and the oxidation catalytic converter unit 40 with, for example, fibrous or matted bearing material interposed, can be firmly connected to a wall of the first deflection housing 30, for example, by material bonding. Alternatively, a tubular housing of the first catalytic converter arrangement 34 can be firmly connected to the first deflection housing 30. The pre-catalytic converter unit 38 or the oxidation catalytic converter unit 40 can then be received in this tubular housing. Each of these units can then in turn be constructed with a jacket and the catalytic converter block received therein, for example, with fibrous or matted material interposed.

The particle filter arrangement 36 forms a third module M3 of the exhaust gas treatment arrangement 12. An entry area 42 of the particle filter arrangement 36 is detachably connected to an exit area 44 of the first catalytic converter arrangement 34, as indicated by a dashed line. For this purpose, the first catalytic converter arrangement 34 and the particle filter arrangement 36, which are constructed in principle using tubular housing elements or jackets, can be formed flange-like in their ends adjoining one another, thus in the entry area 42 and in the exit area 44, and can be connected to one another detachably and in a gas-tight manner by a pipe clamp enclosing these areas or by a plurality of threaded bolts.

An exit area 46 of the particle filter arrangement 36 detachably abuts a second deflection housing 48. The second deflection housing 48 forms a fourth module M4 in the exhaust gas treatment arrangement 12. An entry area 50 of the second deflection housing 48 is connected detachably and in a gas-tight manner to the exit area 46 of the particle filter arrangement for example in a manner as was described above with reference to the connection of the first deflection housing 30 to the first mixing section 14, by a pipe clamp or by a plurality of threaded bolts or the like.

In the second deflection housing 48, the exhaust gas or mixture of exhaust gas and reaction agent flowing out of the first exhaust gas treatment section 32 in the direction of the first exhaust gas treatment section longitudinal axis $L_{A1}$ or in the direction of the exhaust gas treatment arrangement longitudinal axis $L_A$ is deflected and in the area of an exit area 52 of the second deflection housing 48, the exhaust gas leaves the fourth module M4 provided essentially by the second deflection housing 48 in the direction toward a second mixing section 56 essentially including a tubular element 54. An entry area 58 of the second mixing section 56 is detachably connected to the exit area 52 of the second deflection housing 48. The detachable connection can also be connected here in the manner described above with reference to the detachable connection between the exit area 28 of the first mixing section 14 and the entry area 31 of the first deflection housing 30.

A second reaction agent interface 60 is provided in association with the second mixing section 56 on the fourth module M4 or on the second deflection housing 48. In the area of the second reaction agent interface 60, which is essentially opposite to the entry area 58 of the second mixing section 56, a second reaction agent dispensing arrangement 62 is fixed on the second deflection housing 48, so that reaction agent emitted by the second reaction agent dispensing arrangement 62, for example, a urea/water solution, is introduced together with the exhaust gas flowing through the second deflection housing 48 into the entry area 58 of the second mixing section 56. The mixture of exhaust gas and reaction agent flows into the tubular element 54, which is elongated in a second mixing section longitudinal direction $L_{M2}$, of the second mixing section 56, wherein a mixer including a large number of deflection blades or the like can be arranged to assist the mixing in the tubular element 54.

At an exit area 64 of the second mixing section 56, the latter adjoins a third deflection housing 66. The tubular element 54 of the second mixing section 56 can be firmly connected here to a wall of the third deflection housing 66, for example, by welding or the like.

It is to be noted that the deflection housings 30, 48, 66 provided in the exhaust gas treatment arrangement 12, where the mixing sections 14, 56 or the exhaust gas treatment sections 32, 68 adjoin respective entry areas or exit areas thereof, have openings in order to enable the entry or the exit of exhaust gas and possibly reaction agent into or out of deflection chambers formed in the deflection housings 30, 48, 66.

In the third deflection housing 66, the mixture of exhaust gas and reaction agent leaving the second mixing section 56 is deflected by approximately 180° in the direction of a second exhaust gas treatment section designated in general by 68. The second exhaust gas treatment section 68 includes a second catalytic converter arrangement 70 having two main SCR catalytic converter units 72, 74 arranged adjacent to one another transversely to the exhaust gas treatment longitudinal direction $L_A$ and elongated in a second exhaust gas treatment section longitudinal direction $L_{A2}$. Each of the main SCR catalytic converter units 72, 74 can have a tubular jacket, which can be connected firmly and in a gas-tight manner to a wall of the third deflection housing 66 by welding or the like and in each of which at least one catalytic converter block can be held with fibrous or matted material interposed. Alternatively, each of the main SCR catalytic converter units 72, 74 can have a tubular housing firmly connected to the third deflection housing 66, for example, by welding or the like, in each of which at least one catalytic converter unit can be received each having a tubular jacket and a catalytic converter block held therein, for example, by fibrous material or mat material.

Figure 5:
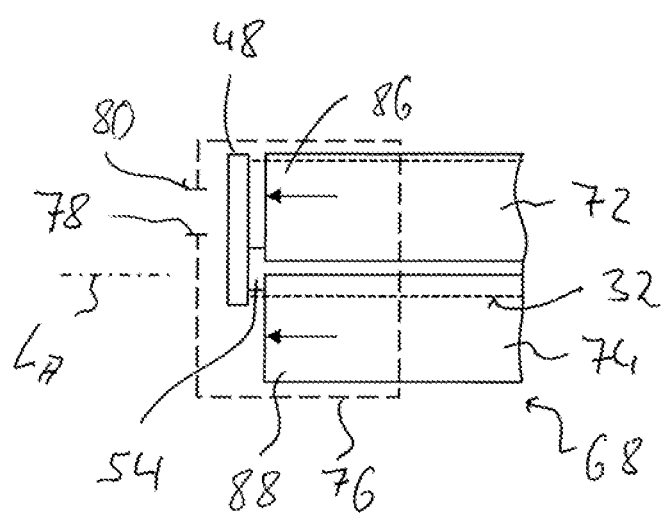

At their downstream ends 86, 88, the two main SCR catalytic converter units 72, 74 of the second catalytic converter arrangement 70 are open to an exit housing, which is designated in general by 76 and is indicated in FIG. 5 by dashed lines. The arrangement can be such that the tubular element 54 of the second mixing section 56 penetrates the exit housing 76 at least in some areas, so that exhaust gas flowing out of the main SCR catalytic converter units 72, 74 can flow around the tubular element 54 at least in some areas and transfers heat thereto in this case. The evaporation of reaction agent in the second mixing section 56 and thus also the mixing of the reaction agent with the exhaust gas can be assisted in this way. An exit interface 80 of the exhaust gas treatment arrangement 12, which is provided, for example, by a tubular element 78 or an opening in the exit housing 76, is provided on the exit housing 76. Using this exit interface 80, the exhaust gas treatment arrangement 12 can be connected to a tubular system area of the exhaust gas system 10, for example, which follows downstream, so that the pollutant-reduced exhaust gas treated in the exhaust gas treatment arrangement 12 can be discharged from the exhaust gas treatment arrangement 12.

To get access to the fourth module M4 essentially provided by the second deflection housing 48 and the particle filter arrangement 36 essentially providing the third module M3, the exit housing 76 can be formed in multiple parts and can have, for example, a detachable housing bottom also providing the exit interface 80. Alternatively or additionally, the exit housing 76 can be configured to open in a lateral area, in order to get access laterally to the system areas of the exhaust gas treatment arrangement 12 located in the interior of the exit housing 76.

Figure 2:
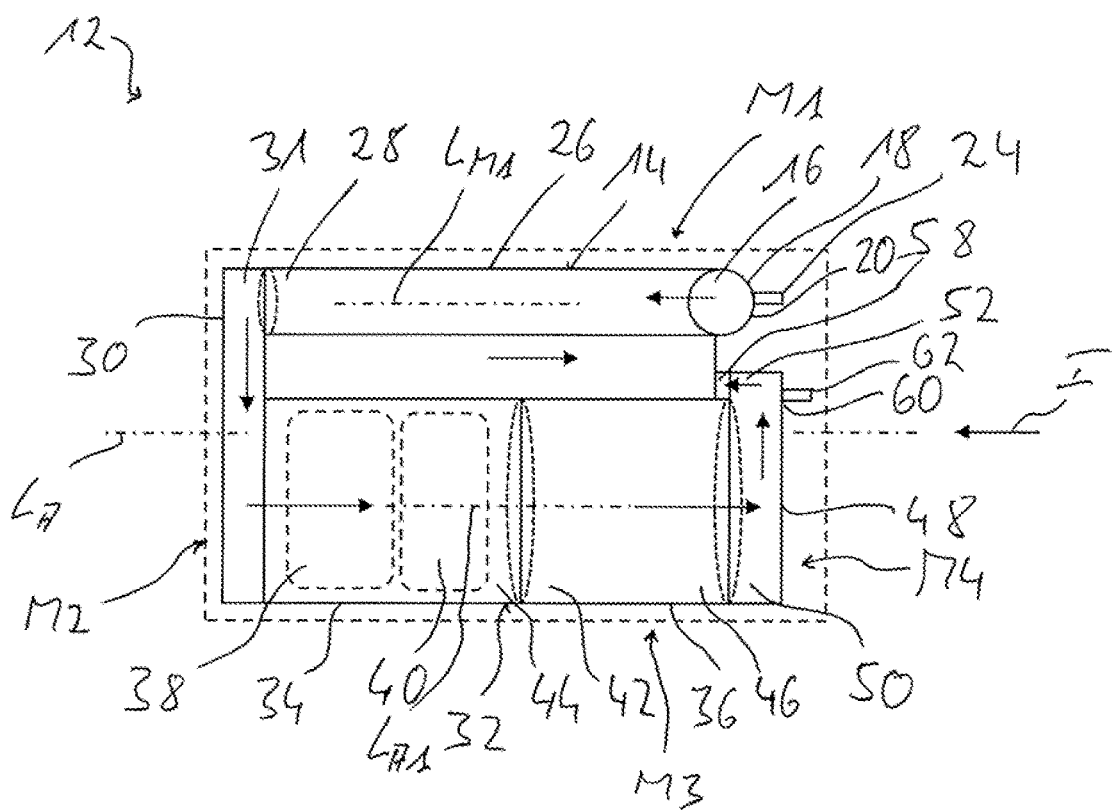
FIG. 2 shows the exhaust gas treatment arrangement of FIG. 1 in the viewing direction II in FIG. 1.
Figure 3:
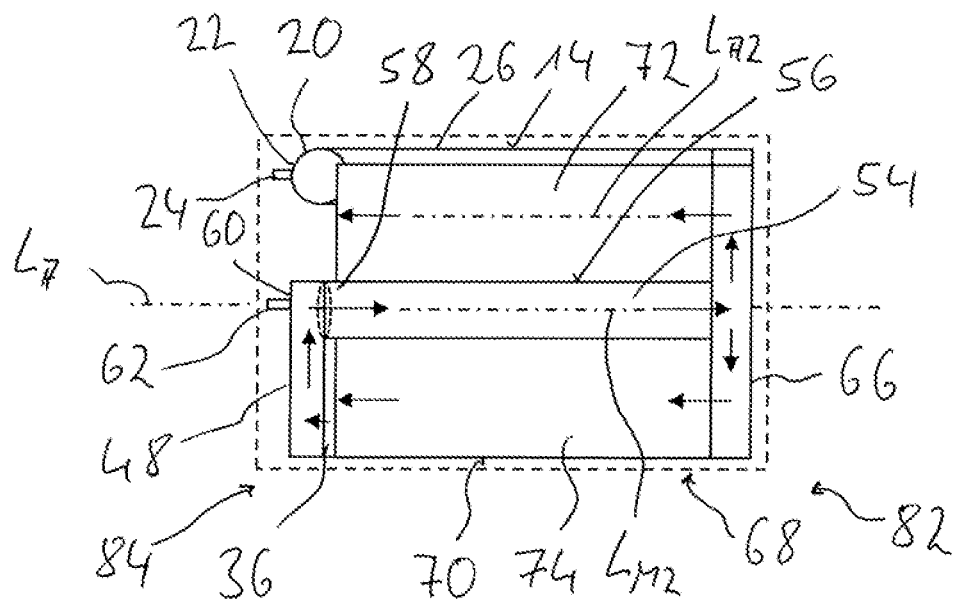
FIG. 3 shows the exhaust gas treatment arrangement of FIG. 1 in the viewing direction III in FIG. 1.

In the exhaust gas treatment arrangement 12 shown in FIGS. 1 to 3, the second mixing section 56, the third deflection housing 66, the second exhaust gas treatment section 68, the exit housing 76, and the exit interface 80 provided thereon thus form a fifth module M5, which is detachably connected in the above-described manner in the area of the entry area 58 of the second mixing section 56 to the fourth module M4 essentially provided by the second deflection housing 48.

Due to the modular structure of the exhaust gas treatment arrangement 12, a compact structure is achieved in which each of the modules M1 to M5 can be constructed separately as such in order to detachably connect the modules, which are provided as such with high structural strength and preferably system areas firmly and permanently connected to one another, such as deflection housings and tubular elements, to one another in the above-described manner. The various system areas of the exhaust gas treatment arrangement 12 which are elongated in the exhaust gas treatment arrangement longitudinal direction $L_A$, thus essentially the two mixing sections 14, 56 and the two exhaust gas treatment sections 32, 68, are located adjacent to one another transversely to the exhaust gas treatment arrangement longitudinal direction $L_A$ and essentially completely overlapping one another axially, so that a structure results in which the first deflection housing 30 and the third deflection housing 66 are positioned essentially in the same axial area or in a first axial end area 82 of the exhaust gas treatment arrangement 12 and the second deflection housing 48 is positioned essentially in a second axial end area 84 of the exhaust gas treatment arrangement 12. The entry interface 18 and the exit interface 80 are also positioned in this second axial end area 84. A fundamentally cuboid outer circumference contour of the entire exhaust gas treatment arrangement 12, which is indicated by dashed lines in FIGS. 1 to 3, thus results, which can be integrated in the installation space provided for this purpose in vehicles, in particular in utility vehicles or trucks.

Due to the above-described arrangement of the various system areas of the exhaust gas treatment arrangement 12 in various modules positioned in relation to one another in a defined manner, it is also possible here to integrate the first mixing section 14 and the pre-SCR catalytic converter unit 38 in the installation space provided for such an exhaust gas treatment arrangement 12. With this compact positioning of the various modules in relation to one another, the second deflection housing 48 essentially providing the fourth module M4 crosses the ends of the two main SCR catalytic converter units 72, 74, which are fundamentally open for the outflow of exhaust gas, transversely to the exhaust gas treatment arrangement longitudinal axis $L_A$. This results in a structure in which the first exhaust gas treatment section 32 and the second mixing section 56 or their longitudinal directions $L_{A1}$, $L_{M2}$ defining respective longitudinal axes, on the one hand, and longitudinal center axes of the two main SCR catalytic converter units 72, 74, essentially extending in the second exhaust gas treatment section longitudinal direction $L_{A2}$, on the other hand, are opposite to one another in pairs with respect to the exhaust gas treatment arrangement longitudinal direction $L_A$, which essentially defines a longitudinal center axis of the exhaust gas treatment arrangement 12, so that a line, which connects the first exhaust gas treatment section longitudinal direction $L_{A1}$ and the second mixing section longitudinal direction $L_{M2}$ and is orthogonal to each of these directions, and a line, which connects the longitudinal center axes of the two main SCR catalytic converter units 72, 74 and is orthogonal to each of these, intersect one another. In the circumferential direction around the exhaust gas treatment arrangement longitudinal direction $L_A$, which essentially defines a longitudinal center axis of the exhaust gas treatment arrangement 12, one of the main SCR catalytic converter units 72, 74 therefore follows the first exhaust gas treatment section 32, the second mixing section 56 follows this main SCR catalytic converter unit of the two main SCR catalytic converter units 72, 74, the other of the two main SCR catalytic converter units 72, 74 follows the second mixing section 56, and then the first exhaust gas treatment section 32 follows the other of the two main SCR catalytic converter units 72, 74.

Due to the detachable connection of the modules M1 to M5 to one another, it is possible to perform maintenance work or repair work in a simple manner. For example, the particle filter arrangement 36, which is strongly subjected to contamination, can easily be taken out of the exhaust gas treatment arrangement 12 and cleaned or replaced with a new or clean particle filter arrangement by opening the detachable connections thereof to the second module M2, on the one hand, and the fourth module M4, on the other hand. Since the modules M2 and M5 containing the respective catalytic converter units or catalytic converter blocks can also be detached as such from the exhaust gas treatment arrangement 12, there is also the possibility of cleaning the catalytic converter units or catalytic converter blocks present in these modules or inserting new modules M2, M5 in the exhaust gas treatment arrangement 12 if necessary.

In spite of the compact construction, only a comparatively low counter pressure is generated in the exhaust gas treatment arrangement 12 as exhaust gas flows through it, to which in particular the fact also contributes that the second exhaust gas treatment section 68, which assumes the significant proportion of the nitrogen oxide reduction, includes two main SCR catalytic converter units 72, 74, through which flow can occur in parallel.

Since the areas in which the various modules M1 to M5 adjoin one another and are detachably connected to one another in the above-described manner are freely accessible from the outside in principle, there is the possibility in the simple manner of visually inspecting these areas of the detachable connection of the various modules to one another and checking them for leak-tightness. Furthermore, this free accessibility also enables the use of conventional tools for opening or establishing the detachable connection of the various modules to one another.

It is understood that the foregoing description is that of the preferred embodiments of the invention and that various changes and modifications may be made thereto without departing from the spirit and scope of the invention as defined in the appended claims.

The invention claimed is:

1. A modularly constructed exhaust gas treatment arrangement comprising:
    an entry interface for receiving exhaust gas into said exhaust gas treatment arrangement;
    a first mixing section having an exit area;
    a first exhaust gas treatment section having a first catalytic converter arrangement and a particle filter arrangement and defining an entry area and an exit area;
    a second mixing section having an entry area and an exit area;
    a second exhaust gas treatment section having a second catalytic converter arrangement and defining an entry area;
    a first deflection housing connecting said exit area of said first mixing section to said entry area of said first exhaust gas treatment section;
    a second deflection housing connecting said exit area of said first exhaust gas treatment section to said entry area of said second mixing section;
    a third deflection housing connecting said exit area of said second mixing section to said entry area of said second exhaust gas treatment section;
    a first module including said entry interface and said first mixing section;
    a second module including said first deflection housing and said first catalytic converter arrangement of said first exhaust gas treatment section;
    said second module being detachably connected to said first module;
    a third module including said particle filter arrangement of said first exhaust gas treatment section;
    said third module being detachably connected to said second module;
    a fourth module including said second deflection housing;
    said fourth module being detachably connected to said third module;
    a fifth module including said second mixing section, said third deflection housing and said second exhaust gas treatment section; and,
    said fifth module being detachably connected to said fourth module;
    wherein said first mixing section is elongated in the direction of a first mixing section longitudinal axis parallel to an exhaust gas treatment arrangement longitudinal axis, said second mixing section is elongated in the direction of a second mixing section longitudinal axis parallel to said longitudinal axis of said exhaust gas treatment arrangement, said first exhaust gas treatment section is elongated in the direction of a first exhaust gas treatment section longitudinal axis parallel to the exhaust gas treatment arrangement longitudinal axis, the second exhaust gas treatment section is elongated in the direction of a second exhaust gas treatment section longitudinal axis parallel to said longitudinal axis of said exhaust gas treatment arrangement, and said first mixing section, said second mixing section, said first exhaust gas treatment section, and said second exhaust gas treatment section are arranged overlapping one another in the direction of said longitudinal axis of said exhaust gas treatment arrangement.

2. The exhaust gas treatment arrangement of claim 1, wherein at least one module of said first module, said second module, said third module, said fourth module, and said fifth module is detachably connected to at least one other module of said first module, said second module, said third module, said fourth module, and said fifth module by a threaded fastener connection and/or a clamp connection.

3. The exhaust gas treatment arrangement of claim 1, wherein said exit area of said first mixing section is detachably connected to an entry area of said first deflection housing.

4. The exhaust gas treatment arrangement of claim 1, wherein an exit area of said first catalytic converter arrangement is detachably connected to an entry area of said particle filter arrangement.

5. The exhaust gas treatment arrangement of claim 1, wherein an exit area of the particle filter arrangement is detachably connected to an entry area of said second deflection housing.

6. The exhaust gas treatment arrangement of claim 1, wherein an exit area of said second deflection housing is detachably connected to said entry area of said second mixing section.

7. The exhaust gas treatment arrangement of claim 1, wherein said first catalytic converter arrangement includes a pre-SCR catalytic converter unit, and said first module has a first reaction agent interface for receiving a first reaction agent dispenser.

8. The exhaust gas treatment arrangement of claim 7, wherein said first reaction agent interface is provided in the region of an entry area of said first mixing section.

9. The exhaust gas treatment arrangement of claim 1, wherein said first catalytic converter arrangement includes an oxidation catalytic converter unit.

10. The exhaust gas treatment arrangement of claim 1, wherein said second catalytic converter arrangement includes at least one main SCR catalytic converter unit, and said fourth module has a second reaction agent interface for receiving a second reaction agent dispenser.

11. The exhaust gas treatment arrangement of claim 10, wherein said second catalytic converter arrangement includes two main SCR catalytic converter units connected in parallel to one another.

12. The exhaust gas treatment arrangement of claim 11, wherein said exhaust gas treatment arrangement defines a longitudinal center axis and, in a circumferential direction around said longitudinal center axis, one of said main SCR catalytic converter units follows said first exhaust gas treatment section, said second mixing section follows said one main SCR catalytic converter unit of said two main SCR catalytic converter units, the other main SCR catalytic converter unit of the two main SCR catalytic converter units follows the second mixing section, and said first exhaust gas treatment section follows the other main SCR catalytic converter unit of said two main SCR catalytic converter units.

13. The exhaust gas treatment arrangement of claim 1, wherein said first deflection housing and said third deflection housing are arranged in a first axial end area of said exhaust gas treatment arrangement with respect to a longitudinal axis of said exhaust gas treatment arrangement, and said second deflection housing is arranged in a second axial end area with respect to said longitudinal axis of said exhaust gas treatment arrangement.

14. The exhaust gas treatment arrangement of claim 1, wherein said exhaust gas treatment arrangement further comprises: an exit housing, and, wherein an exit area of said second exhaust gas treatment section is open to said exit housing, and an exit interface for emitting exhaust gas from said exhaust gas treatment arrangement is provided on said exit housing.

15. The exhaust gas treatment arrangement of claim 14, wherein said exit housing defines an interior; and, at least a part of said second mixing section extends in said interior of said exit housing.

16. An exhaust gas system for an internal combustion engine comprising:
an exhaust gas treatment arrangement;
said exhaust gas treatment arrangement including:
an entry interface for receiving exhaust gas into said exhaust gas treatment arrangement;
a first mixing section having an exit area;
a first exhaust gas treatment section having a first catalytic converter arrangement and a particle filter arrangement and defining an entry area and an exit area;
a second mixing section having an entry area and an exit area;
a second exhaust gas treatment section having a second catalytic converter arrangement and defining an entry area;
a first deflection housing connecting said exit area of said first mixing section to said entry area of said first exhaust gas treatment section;
a second deflection housing connecting said exit area of said first exhaust gas treatment section to said entry area of said second mixing section;
a third deflection housing connecting said exit area of said second mixing section to said entry area of said second exhaust gas treatment section;
a first module including said entry interface and said first mixing section;
a second module including said first deflection housing and said first catalytic converter arrangement of said first exhaust gas treatment section;
said second module being detachably connected to said first module;
a third module including said particle filter arrangement of said first exhaust gas treatment section;
said third module being detachably connected to said second module;
a fourth module including said second deflection housing;
said fourth module being detachably connected to said third module;
a fifth module including said second mixing section, said third deflection housing and said second exhaust gas treatment section; and,
said fifth module being detachably connected to said fourth module;
wherein said first mixing section is elongated in the direction of a first mixing section longitudinal axis parallel to an exhaust gas treatment arrangement longitudinal axis, said second mixing section is elongated in the direction of a second mixing section longitudinal axis parallel to said longitudinal axis of said exhaust gas treatment arrangement, said first exhaust gas treatment section is elongated in the direction of a first exhaust gas treatment section longitudinal axis parallel to the exhaust gas treatment arrangement longitudinal axis, the second exhaust gas treatment section is elongated in the direction of a second exhaust gas treatment section longitudinal axis parallel to said longitudinal axis of said exhaust gas treatment arrangement, and said first mixing section, said second mixing section, said first exhaust gas treatment section, and said second exhaust gas treatment section are arranged overlapping one another in the direction of said longitudinal axis of said exhaust gas treatment arrangement.

\* \* \* \* \*